United States Patent
Wolfman et al.

(10) Patent No.: US 7,551,300 B2
(45) Date of Patent: Jun. 23, 2009

(54) SYSTEM AND METHOD FOR CONTROLLING THE STORAGE AND DESTRUCTION OF DOCUMENTS

(75) Inventors: G. Jonathan Wolfman, Southbury, CT (US); Benjamin Singer, Bridgeport, CT (US)

(73) Assignee: Pitney Bowes Inc., Stamford, CT (US)

( * ) Notice: Subject to any disclaimer, the term of this patent is extended or adjusted under 35 U.S.C. 154(b) by 598 days.

(21) Appl. No.: 11/156,127

(22) Filed: Jun. 17, 2005

(65) Prior Publication Data

US 2006/0285147 A1 Dec. 21, 2006

(51) Int. Cl.
- G06K 15/00 (2006.01)
- H04N 1/00 (2006.01)
- H04N 1/40 (2006.01)

(52) U.S. Cl. ............... 358/1.14; 358/403; 358/404; 358/444; 707/200

(58) Field of Classification Search ........... 358/1.14, 358/403, 404, 444; 707/100, 200; 241/34, 241/100
See application file for complete search history.

(56) References Cited

U.S. PATENT DOCUMENTS

| | | | | |
|---|---|---|---|---|
| 5,354,001 A * | 10/1994 | Hasegawa | ............ | 241/34 |
| 5,813,009 A * | 9/1998 | Johnson et al. | ............ | 707/100 |
| 6,038,035 A * | 3/2000 | Wulforst | ............ | 358/406 |
| 6,427,032 B1 * | 7/2002 | Irons et al. | ............ | 382/306 |
| 6,493,709 B1 * | 12/2002 | Aiken | ............ | 707/4 |
| 6,499,665 B1 * | 12/2002 | Meunier et al. | ............ | 235/487 |
| 6,502,756 B1 | 1/2003 | Fåhraeus | | |
| 6,701,304 B2 * | 3/2004 | Leon | ............ | 705/401 |
| 6,793,723 B2 | 9/2004 | Auslander et al. | | |
| 6,953,119 B1 * | 10/2005 | Wening | ............ | 209/3.3 |
| 7,070,110 B2 * | 7/2006 | Lapstun et al. | ............ | 235/462.45 |
| 7,080,041 B2 * | 7/2006 | Nagel | ............ | 705/51 |
| 7,152,047 B1 * | 12/2006 | Nagel | ............ | 705/76 |
| 7,267,273 B2 * | 9/2007 | Silverbrook et al. | ............ | 235/385 |
| 7,281,133 B2 * | 10/2007 | Ginter et al. | ............ | 713/176 |
| 7,330,974 B1 * | 2/2008 | Silverbrook et al. | ............ | 713/176 |
| 7,337,321 B2 * | 2/2008 | Terada et al. | ............ | 713/176 |
| 2006/0218185 A1 * | 9/2006 | Lemke | ............ | 707/200 |
| 2007/0057099 A1 * | 3/2007 | Kubo et al. | ............ | 241/101.2 |
| 2008/0163364 A1 * | 7/2008 | Ferlitsch | ............ | 707/102 |

* cited by examiner

*Primary Examiner*—Kimberly A Williams
(74) *Attorney, Agent, or Firm*—Ronald Reichman; Angelo N. Chaclas

(57) ABSTRACT

This invention relates to a method and system that only destroys documents that a party wants destroyed. The system also maintains a record of destroyed documents and saved documents. The foregoing may be accomplished by: placing information directly on a document that uniquely identifies the document; placing information in a database that uniquely identifies the document in which information was placed, and the date, if any, in which the document is scheduled to be destroyed; scanning the placed information on documents that are going to be destroyed; attempting to destroy the document; and checking in the database to determine whether or not the document should be destroyed, whereby if the database indicates the document should be destroyed, the document is destroyed, and if the database indicates that the document should not be destroyed, the document is not destroyed.

9 Claims, 5 Drawing Sheets

11

CONTRACT OF SALE

Richard Gold, of 100 Park Avenue, New York, N.Y. 10001, agrees to sell and John Jones, of 300 Park Avenue, agrees to buy as is a blue 25 foot boat having manufacturer, serial number 267890568 for $50,000 to be delivered by Richard Gold to John Jones at Smith's boat yard on or before July 1, 1994.

John Jones is giving Richard Gold a non-refundable deposit of $5,000 upon execution of this contract, and John Jones agrees to pay Richard Gold the remaining sum of $45,000 on or before July 1, 2000.

In the event John Jones fails to perform any of his obligations under this contract, Richard Gold may retain the deposit of $5,000 as the sole damages to which he will be entitled for the breach of the contract by $5,000.

Dated this 10th day of June, 1994.

John Jones　　　　　　　　　Richard Gold
Buyer　　　　　　　　　　　Seller

| | 16 | 17 | 18 |
|---|---|---|---|
| 14 | IDENTIFICATION CODE | DOCUMENT DESCRIPTION | DESTRUCTION DATE |
| | A 100001 | CONTRACT OF SALE FOR BOAT | JULY 1, 2006 |
| | A 100002 | 2004 FEDERAL TAX RETURN | APRIL 15, 2011 |
| 15 | A 100003 | MARCH 15, 2000 JOHN SMITH MEMO | MARCH 15, 2005 |
| | A 100004 | MARCH 15, 2000 JOHN DOE MEMO | MARCH 15, 2006 |

SYSTEM AND METHOD FOR CONTROLLING THE STORAGE AND DESTRUCTION OF DOCUMENTS

FIELD OF THE INVENTION

The invention relates generally to the field of document management and, more particularly, to controlling the storage and destruction of documents.

BACKGROUND OF THE INVENTION

Writing enables the transmission of ideas over vast distances of time and space. As civilization has advanced, more and more ideas and records have been memorialized as written documents. Companies, governments and individuals produce documents to supply a written record of their business. Companies, governments and individuals, to comply with certain laws and regulations also produce documents. Under the law, certain documents must be kept for certain specified periods of time, i.e., employee wages and hours worked, health and safety records, shipment and handling of certain hazardous materials, tax records, etc.

Document management programs have been established to provide systematic procedures for the retention, storage, retrieval, destruction and/or protection of documents. Many document management programs archive paper documents by scanning the document and storing the scanned image of the document in an electronic storage database. Since the documents are often stored in databases to save space, the paper document is destroyed after the documents have been scanned.

Thus, a problem of the prior art is that some times paper documents were destroyed by parties who did not want to destroy the documents.

Another problem of the prior art is that parties did not have a record of which documents were saved and which documents were destroyed.

SUMMARY OF THE INVENTION

This invention overcomes the disadvantages of the prior art by providing a system that only destroys documents that a party wants destroyed. The system also maintains a record of destroyed and saved documents. The foregoing system may be accomplished by: placing information directly on a document that uniquely identifies the document; placing information in a database that uniquely identifies the document in which information was placed and the date, if any, in which the document is scheduled to be destroyed; scanning the placed information on documents; attempting to destroy the document; checking the database to determine whether or not the document should be destroyed; whereby if the database indicates the document should be destroyed, the document is destroyed; and if the database indicates that the document should not be destroyed, the document is not destroyed.

BRIEF DESCRIPTION OF THE DRAWING

FIG. 1 is a drawing of a document;

FIG. 2 is a drawing of a display that shows the documents entered into the system of this invention;

DETAILED DESCRIPTION OF THE PREFERRED EMBODIMENT

Figure 3:
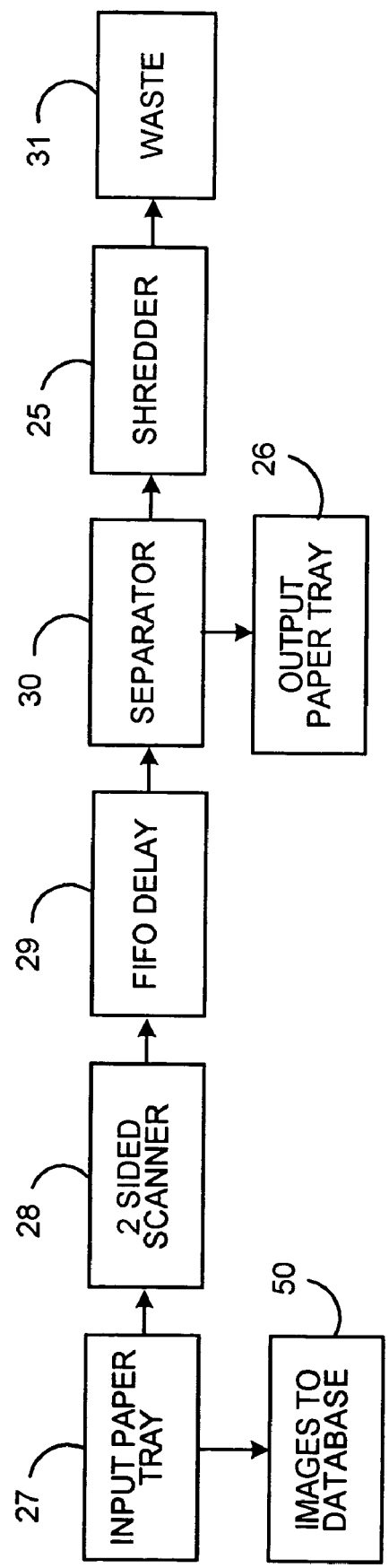
FIG. 3 is a block diagram illustrating the operation of this invention.

Referring now to the drawings in detail and more particularly to FIG. 1, the reference character 11 represents a document that is of a contract of sale. A document identification code 12 is placed at a convenient location on document 11. Identification code 12 may be represented by alphanumeric characters, a bar code, a two-dimensional bar code, glyphs, etc. Code 12 may be printed on document 11 with a black ink, colored ink, toner, invisible ink, black fluorescent ink, etc. or affixed to a label that is attached to document 11. A black fluorescent is disclosed in the Auslander et, al U.S. Pat. No. 6,793,723 entitled "Homogeneous Photosensitive Optically Variable Ink Compositions For Ink Jet Printing" herein incorporated by reference.

It would be obvious to one skilled in the art that document 11 may be printed on an Anoto paper page with an Anoto pattern on the paper page that represents a unique Anoto page address so that the Anoto pattern will be code 12. Anoto systems use a digital pen that contains a camera and paper in a fashion that the pen's movement across the grid surface on the paper is stored as a series of map coordinates. The coordinates correspond to the exact location of the page that is being written on. When a mark is made on the send box on the paper with a digital pen, the pen is instructed to send the stored sequence of map coordinates which are translated into an image that will result in an exact copy of what is written on the paper with the pen, which may be stored and displayed in a computer. Anoto systems are sold by Anoto Inc. of 470 Totten Pond Road, Waltham, Mass. 02451

FIG. 2 is a drawing of a display 14 that displays the documents entered into the system of this invention. Display 14 has a screen 15 that displays the identification code 12 of FIG. 1, in columns 16, the document description in column 17, and the planned destruction date or document status, i.e., the document has been scanned and is ready to be shredded, of the document in column 18

FIG. 3 is a block diagram illustrating the operation of this invention, particularly, the paper path of documents 11 being transported to a shredder 25 or output paper tray 26. All of the potential documents to be shredded are placed by the user of this system in input paper tray 27. Input paper tray 27 may be any document feeder that accepts 8.5"×11" paper or other size or format required for the documents that are potentially going to be shredded. The input paper tray 27 takes one sheet of paper at a time from a document from the stack of documents in tray 27 and passes that sheet of paper that comprises all or a portion of a document 11 to two-sided scanner 28. Scanner 28 may be the fi4860C Scanner manufactured by Fjuitsu Limited of Shidona City Center, 1-5-2 Hiashia Shintosiu, Minato-Kutokyo 105-7123 Japan.

Scanner 28 makes a digital image of both sides of the single sheet of paper that comprises all or a portion of a document 11. Scanner 28 uses conventional available scanner technology which may be accomplished by using either two scanning mechanisms simultaneously or by sequentially imaging the paper first on one side and then the other. When the imaging is done, scanner 28 passes the single sheet of paper of document 11 onto the first in first out (FIFO) delay 29. After the images of the single sheet of paper of document 11 are created, they are passed to a computer application, which is described in the description of FIG. 4.

The images will also be used to compute the path control signal, i.e., is the document 11 going to be sent to shredder 25 or output paper tray 26, required by separator 30.

FIFO delay 29 takes the single sheet of paper that comprises all or a portion of a document 11 from scanner 28 and holds it until separator 30 is ready to accept it. FIFO 29 works like a First In First Out buffer of the paper between the scanner 28 and separator 30.

Figure 4:
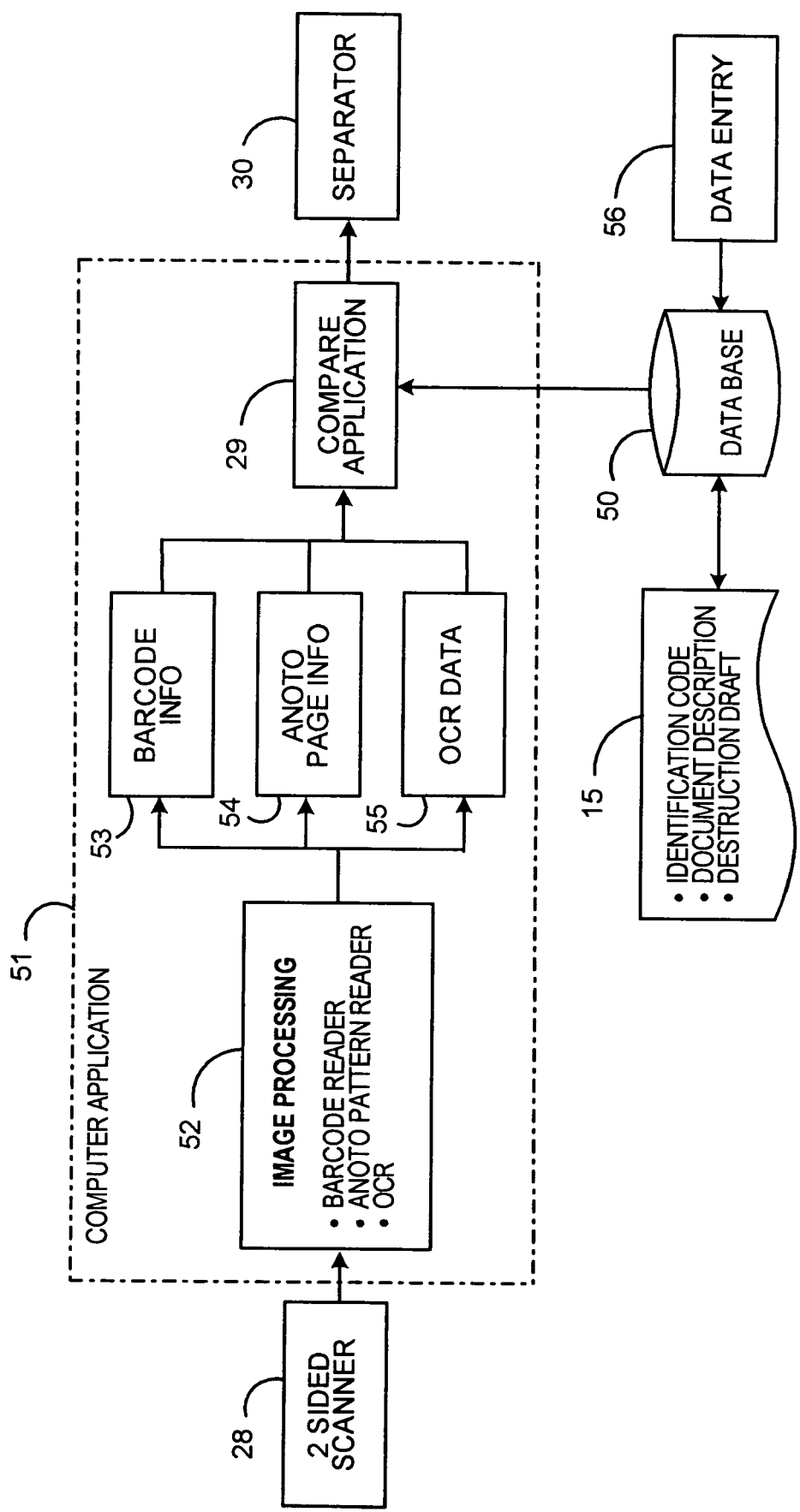
FIG. 4 is block diagram of a computer application illustrating the decision path for shredding documents and a computer application.

This function of delay 29 is optional and would be implemented only to optimize the latency of the mechanical paper path to match the latency of the computer application described in FIG. 4 that creates the "Path control signal" Signals required by separator 30.

Separator 30 takes the single sheet of paper of document 11 from FIFO delay 29 (if implemented) or scanner 28. Separator 30 uses control signals from the computing application (which is described in the description of FIG. 4) to decide the path of each sheet of paper of document 11. If the control signal indicates that the sheet of paper of document 11 is to be shredded, the sheet of paper is transferred to shredder 25. If the computing application detects that sheet of paper of document 11 should not be shredded, the sheet of paper is diverted to output paper tray 26, where the user can retrieve the diverted sheets of paper that comprise document 11. Separator 30 may be the diverter portion of a laser printer, i.e., the long plastic panel that is activated by a solenoid so that when the solenoid is open, the paper passes under the plastic panel, and when the solenoid is closed, the paper moves over the plastic panel to take another path. Separator 30 is contained in the HP laser jet 8150 printer with duplex unit manufactured by Hewlett Packard Company, 3000 Hanover Street, Palo Alto, Calif. 94304-1185.

Shredder 25 takes the single sheet of paper of document 11 from separator 30 that is to be shredded. The paper is shredded in any of the conventional ways sufficient to render the original single sheet of paper of document 11 unreadable without extensive and extra ordinary effort. The unreadable original single sheet of paper of document 11 then goes into waste paper basket 31. Shredder 25 may be the Fellows Power Shredder manufactured by Fellows, Inc. of 1789 Norwood Avenue, Liascu, Ill. 60143.

Output paper tray 26 takes the original single sheet of paper of document 11 from separator 30 that is to be preserved and not shredded. The user would retrieve all documents from the tray 26 and return them to a secure place.

FIG. 4 is block diagram of a computer application illustrating the decision path for shredding documents 11. The image of the original single sheet of paper of document 11 that has been scanned by scanner 28 passed through a set of filters and algorithms to extract data from the original single sheet of paper of document 11. This data is processed by image processing 52. Image processing 52 may be the Task Master Recognition software program written by Data Cap Inc. of 660 White Plains Road, Tarrytown, N.Y. 10591. There are at least three forms of information that can be used by image processing 52 that may be extracted to uniquely identify the aforementioned page of paper. The first (1) mode of identifying the page is through the use of barcodes. If the page has a barcode of any kind, the image processor contained in scanner 28 should locate the barcode and extract the data from that barcode and pass the data to barcode information database 53 and then to the compare application 29. The flow chart for application 29 is described in the description of FIG. 5. The second (2) mode of uniquely identifying a page is to use an Anoto pattern. If the abovementioned paper page was an Anoto paper page, with an Anoto pattern on it, the pattern is read to determine the unique Anoto Page Address. This address is first passed to anoto page information database 54 and then to the compare application 29. The third (3) mode of uniquely identifying the aforementioned page is to extract data typed or handwritten on the page. If there are fields that identify the document uniquely, those fields are extracted through a character recognition function, i.e., Optical Character Recognition or Intelligent Character Recognition and that data from this operation will be transmitted to OCR database 55 and then to compare application 29. The above three methods may be used individually or in combination. The more data available to uniquely identify the original single sheet of paper of document 11, the higher the confidence that the page that is being shredded was identified correctly.

The Compare application 29 consists of software running in computer 51 that compares the data extracted by scanner 28 to data held in database 50. Database 50 contains a series of records that have information to identify every document 11 known in the environment combined with an indication of that document's scheduled destruction date. If the document 11 has a destruction date before the present date or is an inactive file that the user wants to destroy, it should not be shredded. If the document 11 has a destruction date before the present date, it should be shredded. When the compare application 29 receives the barcode, Anoto, or other OCR data from the document 11 that uniquely identifies it, then the compare application 29 searches the database 50, and reads the scheduled destruction date of the document 11. If the compare application 29 finds the document 11 should be shredded, the path control signal to separator 30 commands that the document 11 be shredded. In all other cases, the path control signal will tell separator 30 to save document 11 in the output tray 26.

Database 50 is coupled to data entry 56 and display 14 of computer 51. A user may change the scheduled destruction date of any document 11 by entering a new destruction date for a document 11 in data entry 56. The information entered in data entry 56 is stored in database 50 and displayed on screen 15 of display 14.

Figure 5:
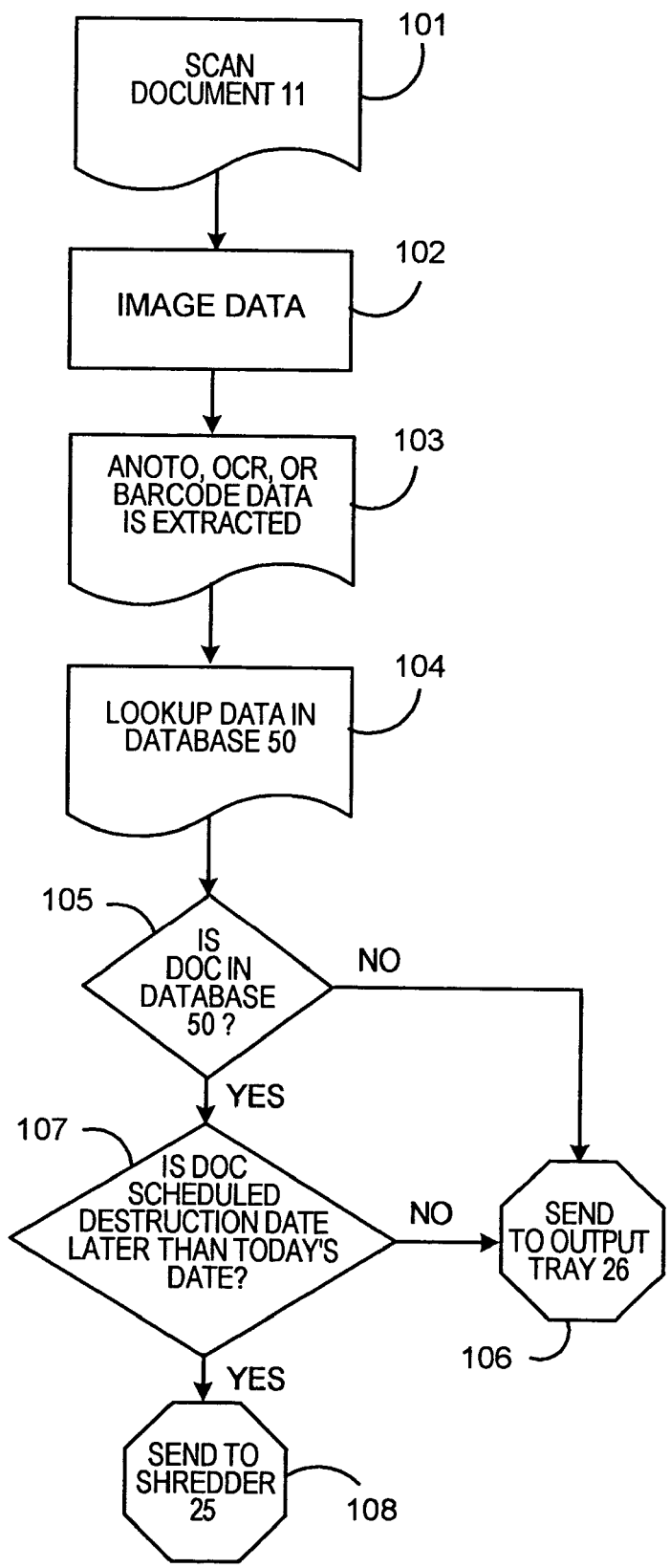
FIG. 5 is a flow chart of the compare application.

FIG. 5 is a flow chart of compare application 29. The program begins in step 101 where document 11 is scanned. Then in step 102, image data is obtained from document 11. Next in step 103, Anoto, OCR or barcode data is extracted from document 11. Then in step 104, document data is looked up in database 50, i.e., identification code 12 for document 11, scheduled destruction date for document 11. Step 105 is the next step. Step 105 determines whether or not identification code 12 for document 11 is listed in database 50. If the identification code 12 for document 11 is not listed in database 50, the next step will be step 106. Step 106 will send document 11 to output paper tray 26. If the identification code 12 for document 11 is listed in database 50, the next step will be step 107. Step 107 determines whether or not the document 11 scheduled destruction date is later than today's date. If step 107 determines that the scheduled destruction date of document 11 is later than today's date, the next step will be step 106. Step 106 will send document 11 to output paper tray 26. If step 107 determines that the scheduled destruction date of document 11 is not later than today's date, the next step will be step 108. Step 108 will send document 11 to shredder 25 to be destroyed.

The above specification describes a new and improved system that only destroys documents that a party wants destroyed. It is realized that the above description may indicate to those skilled in the art additional ways in which the principles of this invention may be used without departing from the spirit. Therefore, it is intended that this invention be limited only by the scope of the appended claims.

What is claimed is:

1. A system for managing documents, said system comprising:
   (a) a paper document having a unique code affixed thereto that uniquely identifies the document;
   (b) a database that stores the code and a date, if any, in which the document is scheduled to be destroyed;
   (c) a scanner that reads the code affixed to the document;
   (d) a buffer that holds the document;
   (e) a computer that checksthe database to determine whether or not the document should be destroyed, while the document is in the buffer enters, whereby if the database indicates the document should be destroyed, the document is transferred from the buffer to a shredder for destruction and if the database indicates that the document should not be destroyed, the document is transferred from the buffer to a tray.

2. The system claimed in claim 1, wherein the unique code is selected from the group consisting of: alphanumeric characters, a bar code, a two dimensional bar code, glyphs, and an Anoto pattern.

3. The system claimed in claim 1, wherein the unique code is affixed to a label that is affixed to the document.

4. The system claimed in claim 1, wherein the unique code is printed with an ink selected from the group consisting of: an invisible ink and black fluorescent ink.

5. The system claimed in claim 1, further comprising:
   means for changing the information in the database that indicates the date which the document is scheduled to be destroyed.

6. The system claimed in claim 1, further comprising:
   means for displaying the information in the database.

7. The system claimed in claim 6, wherein said displaying means is a computer display.

8. The system claimed in claim 1, wherein the database indicates the date that the document should be destroyed.

9. The system claimed in claim 1, wherein the database indicates the occurrence of an event that will trigger the shredding of the document.

* * * * *